US008737809B2

(12) United States Patent
Suh

(10) Patent No.: US 8,737,809 B2
(45) Date of Patent: May 27, 2014

(54) CONTENT PLAYING APPARATUS AND CONTROL METHOD THEREOF

(71) Applicant: Samsung Electronics Co., Ltd., Suwon-si (KR)

(72) Inventor: In-kyo Suh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/685,299

(22) Filed: Nov. 26, 2012

(65) Prior Publication Data

US 2013/0163959 A1 Jun. 27, 2013

(30) Foreign Application Priority Data

Dec. 21, 2011 (KR) .................. 10-2011-0139338

(51) Int. Cl.
*H04N 9/80* (2006.01)
(52) U.S. Cl.
USPC .......................................... 386/241
(58) Field of Classification Search
CPC ............. G06F 17/30787; G06K 9/00711; G11B 27/10
USPC ............................................ 386/200, 241
See application file for complete search history.

(56) References Cited

U.S. PATENT DOCUMENTS

| 6,163,510 | A * | 12/2000 | Lee et al. ............... 386/281 |
| 6,973,256 | B1 * | 12/2005 | Dagtas ................. 386/241 |
| 2007/0201819 | A1 | 8/2007 | Sung et al. |
| 2008/0152301 | A1 | 6/2008 | Cho |

FOREIGN PATENT DOCUMENTS

| KR | 1020070080982 A | 8/2007 |
| KR | 1020080057826 A | 6/2008 |
| KR | 1020090081702 A | 7/2009 |

* cited by examiner

*Primary Examiner* — Huy T Nguyen
(74) *Attorney, Agent, or Firm* — Sughrue Mion, PLLC

(57) ABSTRACT

A content playing apparatus and method are provided, the content playing apparatus including: a receiver which receives content including a video and an audio; a storage unit which stores the received content; a processor which processes the content to play the stored content; an output unit which outputs a video and an audio of the played content; and a controller which generates an index of the video based on properties of the audio, and plays a part of the video corresponding to the properties of the audio at the part of the video by referring to the index.

15 Claims, 6 Drawing Sheets

CONTENT PLAYING APPARATUS AND CONTROL METHOD THEREOF

CROSS-REFERENCE TO RELATED APPLICATION

This application claims priority from Korean Patent Application No. 10-2011-0139338, filed on Dec. 21, 2011 in the Korean Intellectual Property Office, the disclosure of which is incorporated herein by reference.

BACKGROUND

1. Field

Apparatuses and methods consistent with exemplary embodiments relate to playing content, and more particularly, to a content playing apparatus and a control method thereof which play content by referring to an index.

2. Description of the Related Art

A content playing apparatus such as a television (TV), a set-top box, or a digital video recorder (DVR), plays content including video and/or audio (hereinafter, the "content"). The content playing apparatus may play the content at a speed which is faster than a normal playing speed, e.g., double speed to search a scene.

A related art content playing apparatus plays content at a fast speed by referring to simple off-set information or by referring to an index reflecting the properties of a video (I-screen, P-screen, etc.). However, if the content is large in size, a user may not easily search for a desired scene.

SUMMARY

One or more exemplary embodiments provide a content playing apparatus and a control method thereof which plays content by using an index to easily and promptly search for and display a desired scene.

According to an aspect of an exemplary embodiment, there is provided a content playing apparatus including: a receiver which receives content including video and audio; a storage unit which stores the received content; a processor which processes the content to play the stored content; an output unit which outputs a video and an audio of the played content; and a controller which generates an index of the video based on properties of the audio, and plays a part of the video corresponding to the properties of the audio at the part of the video by referring to the index.

The controller may assign at least one of a plurality of types of audio to the index of the video based on the properties of the audio at corresponding parts of the video, and play the part of the video corresponding to a type of the audio.

The controller may play the part of the video corresponding to a type of the audio selected by a user from among the plurality of types of the audio.

The controller may generate the index when the received content is stored in the storage unit.

The controller may generate an index of the type of the audio selected by a user from among the plurality of types of the audio.

The controller may determine a type of the audio to be assigned to the index by matching properties of the audio and information about a plurality of detailed types of the audio that are provided in advance.

The controller may designate at least one of the plurality of detailed types of the audio according to a user's input.

The controller may play a part of the video corresponding to properties of the audio at the part of the video at a speed designated by a user.

According to an aspect of another exemplary embodiment, there is provided a control method of a content playing apparatus including: receiving content including a video and an audio; storing the received content; generating an index of a video based on properties of the audio; playing a part of the video corresponding to the properties of the audio at the part of the video by referring to the generated index.

The generating the index may include assigning at least one of plurality of types of the audio to the index of the video based on the properties of the audio at corresponding parts of the video, and the playing the video includes playing the part of the video corresponding to a type of the audio at the part of the video.

The playing the video may include playing the part of the video corresponding to a type of the audio selected by a user from among the plurality of types of the audio.

The generating the index may include generating the index when the received content is stored in a storage unit.

The generating the index may include generating an index for the type of the audio selected by a user from among the plurality of types of the audio.

The generating the index may include determining the type of the audio to be assigned to the index by matching properties of the audio and a plurality of detailed types of the audio that are provided in advance.

The generating the index may include designating at least one of the plurality of detailed types of audio according to a user's input.

The playing the video may include playing the part of the video corresponding to the properties of the audio at the part of the video at a speed designated by a user.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
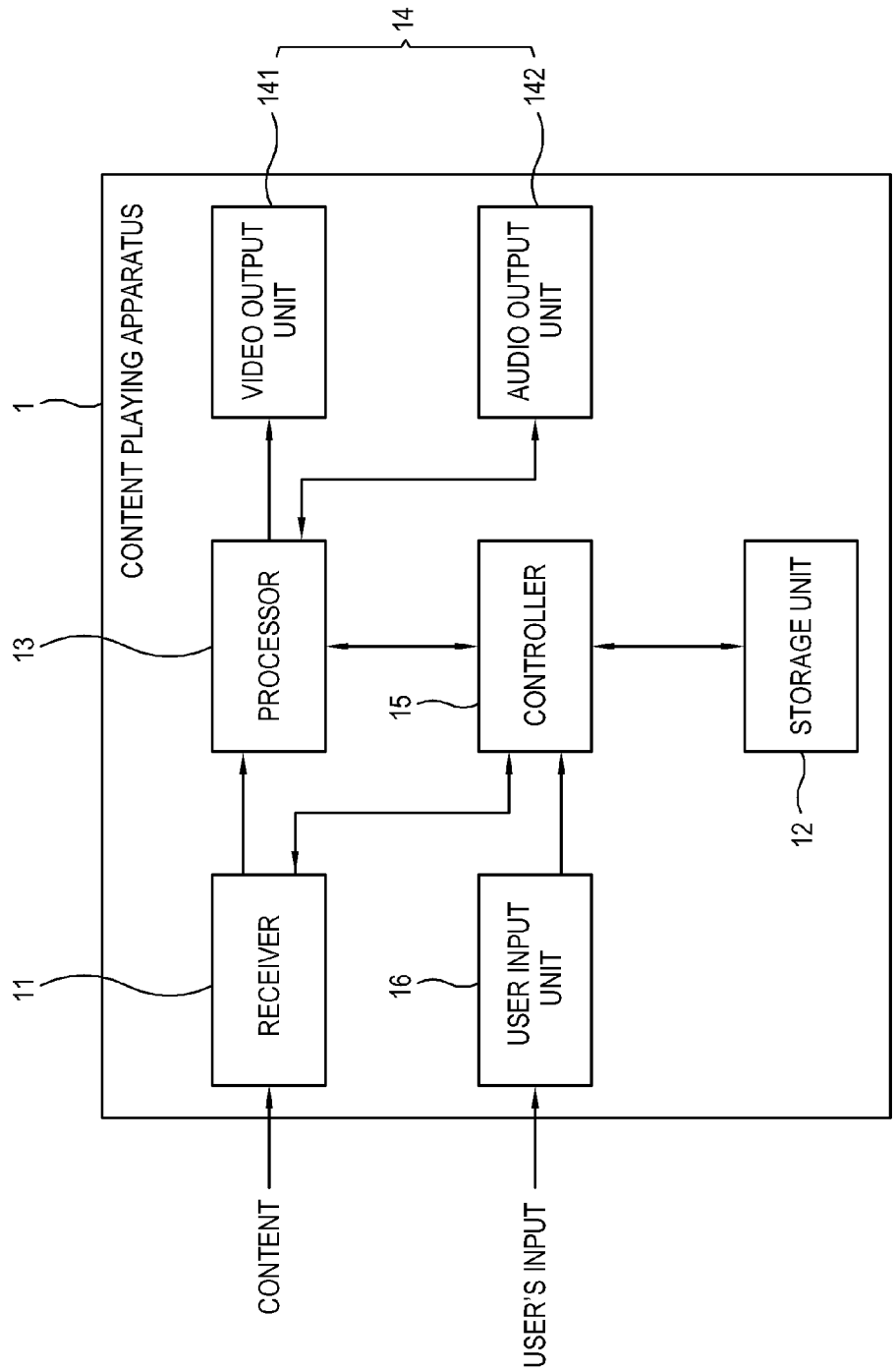
FIG. 1 is a block diagram of a content playing apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of a content playing apparatus according to an exemplary embodiment. As shown therein, a content playing apparatus 1 includes a receiver 11, a storage unit 12, a processor 13, an output unit 14 and a controller 15.

The receiver 11 receives content. The content may include video and audio such as movies, dramas, sports, news, music videos, but is not limited thereto. The receiver 11 may receive content through a TV broadcasting signal. The receiver 11 includes a tuner to receive the TV broadcasting signal. Otherwise, the receiver 11 may receive content through a network such as the Internet. In this case, the receiver 11 includes a network communication unit. The receiver 11 may receive content from a video device such as a digital video disc (DVD) player, a Blu-Ray Disc (BD) player or a PC. In this case, the receiver 11 may include a signal receiver to receive a signal from the video device. The receiver 11 may also receive content from a mobile device such as a smart phone or a smart touchpad. In this case, the receiver 11 includes a wireless communication unit to wirelessly communicate with the mobile device. The receiver 11 may also receive content from a content storing device such as a universal serial bus (USB) storage medium. In this case, the receiver 11 includes a data receiver to receive content data from the content storing device. The receiver 11 may read content from media which stores content such as a DVD or a BD. In this case, the receiver 11 includes a content reading means.

The storage unit 12 stores content received by the receiver 11. The storage unit 12 may include non-volatile memory such as a flash memory or a hard disk.

The processor 13 processes content to play the stored content. The processor 13 extracts video and audio from the content. The processor 13 may decode the content when extracting the video and audio from the content.

The output unit 14 outputs the video and audio extracted by the processor 13. The output unit 14 includes a video output unit 141 to output video; and an audio output unit 142 to output audio. The video output unit 141 may include a display unit such as display screen to display video. The video output unit 141 may otherwise include a video transmission unit, such as a video transmitter, to transmit the video to an external display apparatus. The audio output unit 142 may include a speaker to output audio. The audio output unit 142 may otherwise include an audio transmission unit, such as an audio transmitter, to transmit audio to an external audio output apparatus.

The controller 15 generates an index of a video corresponding to properties of an audio, and plays a part of the video corresponding to the properties of the audio at the part of the video by referring to the generated index. The controller 15 may assign one of a plurality of types of the audio based on the properties of the audio to the index, and play a part of the video corresponding to the type of the audio. The controller 15 may play a part of the video corresponding to the type of the audio selected by a user from among the plurality of types of the audio. In this case, the content playing apparatus 1 may further include a user input unit 16 to receive a user's input.

The controller 15 may generate an index when the received content is stored in the storage unit 12. The controller 15 may determine a type of the audio to which the index is assigned, by matching properties of the audio and a plurality of types of the audio provided in advance. The controller 15 may also designate at least one detailed type of audio corresponding to the type of audio selected by a user's input. The controller 15 may play a part of the video corresponding to the properties of the audio at a speed designated by a user.

Generation of the index by the controller 15 and playing of the video based on the index will be described in detail. The controller 15 may include a non-volatile memory which stores therein a control program to perform control operations, a volatile memory which loads at least a part of the stored control program, and a microprocessor which executes the loaded control program.

As described above, the content playing apparatus 1 according to the exemplary embodiment generates an index for searching for a scene of a video based on properties of an audio, enables a user to search for a scene by using the generated index when the video is played. Thus, a user may access a desired scene conveniently and promptly.

Figure 2:
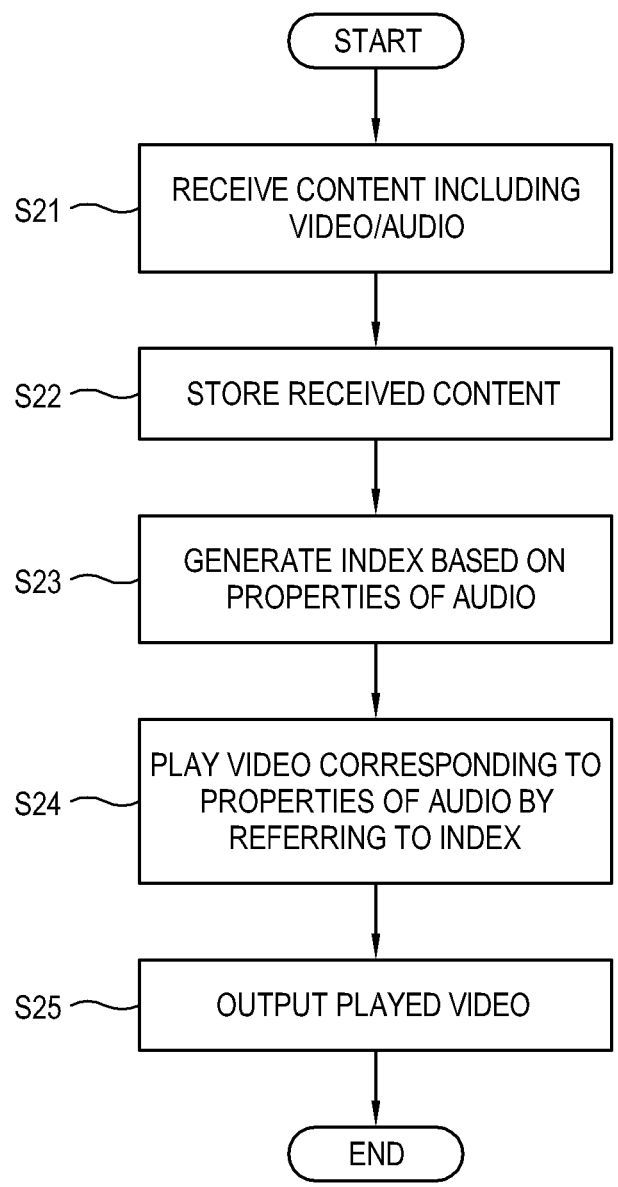
FIG. 2 is a flowchart of a control method of the content playing apparatus in FIG. 1.

FIG. 2 is a flowchart of a control method of the content playing apparatus 1 according to the exemplary embodiment. At operation S21, the content playing apparatus 1 receives content including video and audio. At operation S22, the content playing apparatus 1 stores the received content. At operation S23, the content playing apparatus 1 generates n index based on properties of the audio.

Figure 3:
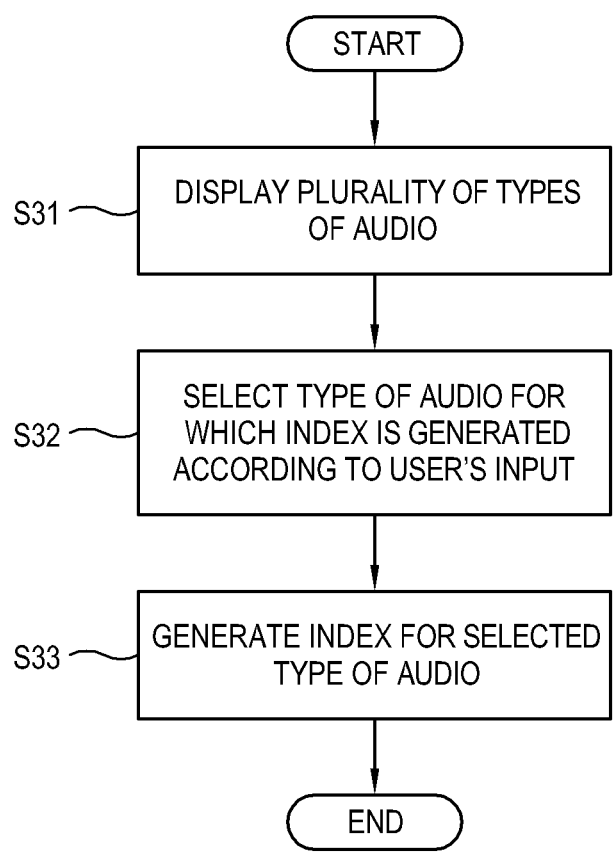
FIG. 3 is a flowchart of detailed operations for generating an index by the content playing apparatus in FIG. 1.
Figure 4:
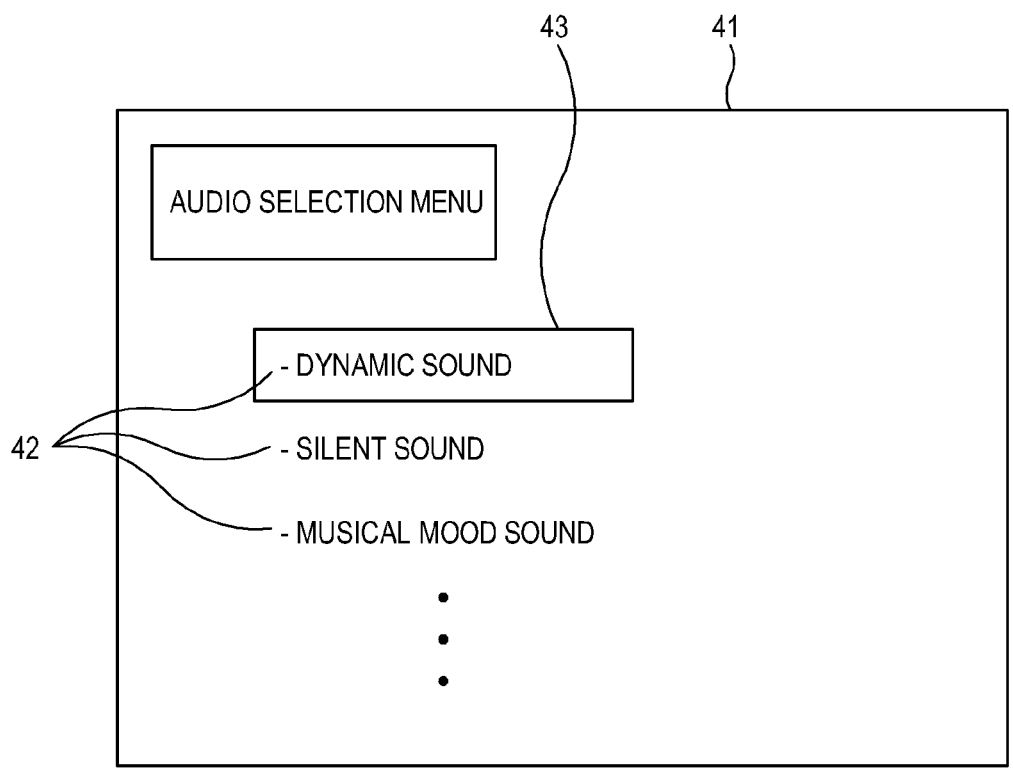
FIG. 4 illustrates an example of displaying a plurality of audio types by the content playing apparatus in FIG. 1.

FIG. 3 is a flowchart of generating the index based on the properties of the audio. At operation S31, the content playing apparatus 1 displays a plurality of types of an audio. FIG. 4 illustrates an example of displaying a plurality of types of an audio. The reference numeral 41 refers to an audio selection menu for displaying a plurality of types of an audio. The audio selection menu 41 may be displayed on a video output unit 141 or an external display apparatus. The content playing apparatus 1 may display the audio selection menu when the content is stored, i.e., when the content is recorded. The audio selection menu 41 may display only the types of the audio corresponding to properties of the audio of the content. The audio selection menu 41 may include a plurality of items 42 corresponding to the plurality of types of audios. The plurality of types of the audio may include 'dynamic sound', 'silent music', 'musical mood sound', etc. as shown in FIG. 4. The content playing apparatus 1 may highlight one of the plurality of items 42 to select the type of the audio by using the audio selection menu 41, and move the highlight according to a user's input (refer to reference numeral 43).

At operation S32, the content playing apparatus 1 selects the type of the audio for which the index is generated among the plurality of types of the audio, by a user's input. For example, as shown in FIG. 4, a user may select 'dynamic sound' as the type of the audio. A user may also select two or more types of the audio. At operation S33, the content playing apparatus 1 generates an index of a video with respect to the type of the audio selected by a user. For example, if a user selects 'dynamic sound' as the type of the audio, the content playing apparatus 1 generates an index for the part of the content having the properties of the audio of 'dynamic sound'.

According to another exemplary embodiment, the content playing apparatus 1 may determine the type of the audio to which the index is assigned, by matching the properties of the audio of the content with a plurality of detailed types of the audio provided in advance. For example, the plurality of detailed types of the audio may include sports, accident site news, human voices, nature's sound, classical music, jazz music, etc. If properties of the audio in any part of the content match sports or accident site news, the matching part may be determined to include a 'dynamic sound' as the type of the audio. Otherwise, if the properties of the audio match the human voice or nature's sound, the matching part may be determined to include a 'silent sound' as the type of the audio. If the properties of the audio match classical music or jazz music, for example, the matching part may be determined to include 'music mood sound' type of the audio. According to another exemplary embodiment, the content playing apparatus 1 may designate the detailed type of the audio corresponding to any type of audio according to a user's input.

Figure 5:
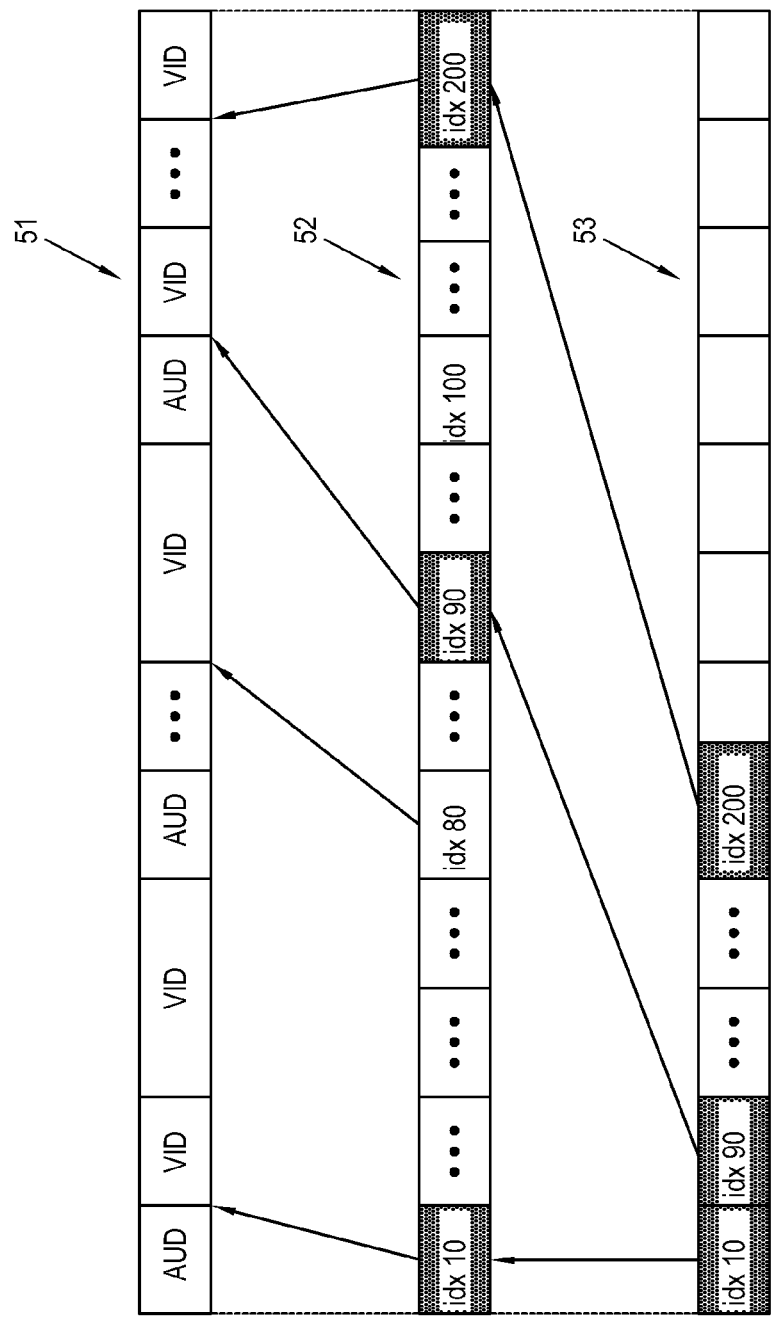
FIG. 5 illustrates an example of an index generated by the content playing apparatus in FIG. 1.

FIG. 5 illustrates an example of an index according to the exemplary embodiment. The reference numeral 51 refers to the content, 'VID' refers to video, and 'AUD' refers to audio. The reference numeral 52 refers to an index based on properties of the video. 'idx 10' and 'idx 80' index the position of corresponding videos. The reference numeral 53 refers to an index based on properties of an audio. 'idx 10' and 'idx 90' in the audio index 53 reference (or index) corresponding parts of the index 52 of a corresponding video. The configuration of the index in FIG. 5 is exemplary, but it does not limit the scope of the inventive concept. For example, the index of the audio may not refer to the index of the video, and may directly index the position of the video. The audio index may be recorded in an information file of a video index or provided as an additional information file.

Returning to FIG. 2, at operation S24, the content playing apparatus 1 plays the video corresponding to properties of the audio by referring to the generated index. The content playing apparatus 1 may play a part of the video corresponding to the properties of a particular audio from the entire content by referring to the index. The content playing apparatus 1 may play a part of the video at a speed designated by a user's input if the video corresponding to the selected type of the audio is played.

Figure 6:
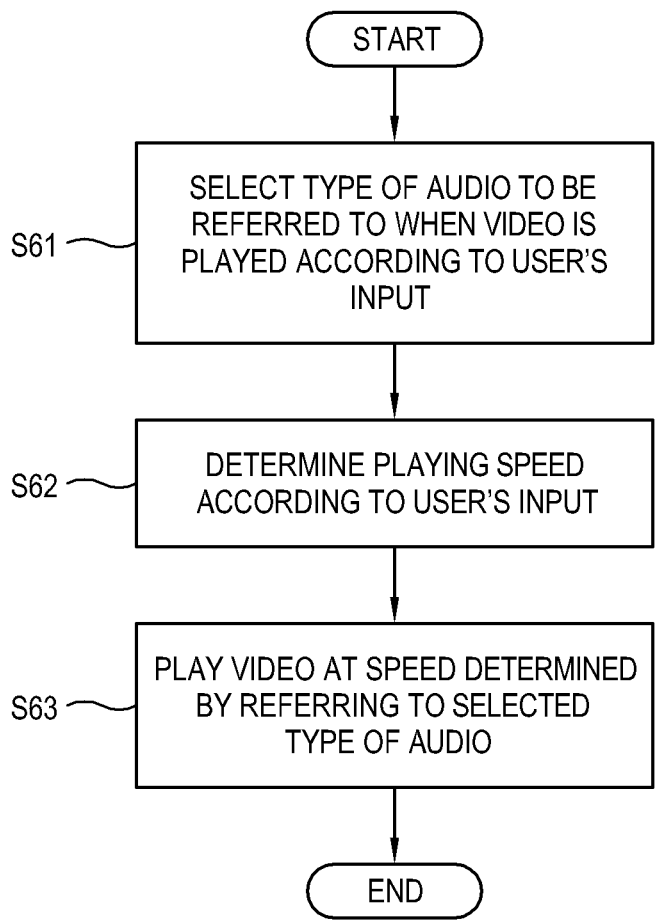
FIG. 6 is a flowchart of detailed operations for playing a video by referring to an index in the content playing apparatus in FIG. 1.

FIG. 6 is a flowchart of detailed operations for playing a part of a video corresponding to properties of an audio by referring to an index. At operation S61, the content playing apparatus 1 selects the type of the audio to be referred to when the part of a video is played according to a user's input. The content playing apparatus 1 may display a menu (not shown) to select the type of the audio. At operation S62, the content playing apparatus 1 may determine the speed at which the video is played according to a user's input. The playing speed may be e.g., double the speed of a normal playing speed. At operation S63, the content playing apparatus 1 plays the video at the speed that is determined by referring to the index of the selected type of the audio. For example, if a user selects 'dynamic sound' as the type of the audio, the content playing apparatus 1 may play the part of the video having the properties of the audio which are of the 'dynamic sound' type at a predetermined speed.

Referring to FIG. 2, at operation S25, the content playing apparatus 1 outputs the played video.

As described above, the content playing apparatus 1 may search for a desired scene from the entire content more conveniently and promptly by using an index based on an audio.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A content playing apparatus comprising:
a processor which processes content comprising audio and video; and
a controller which generates an index of the video based on properties of the audio, and plays a part of the video corresponding to the properties of the audio at the part of the video by referring to the index,
wherein the controller assigns at least one of a plurality of types of audio to the index of the video based on the properties of the audio at corresponding parts of the video, and plays the part of the video corresponding to a type of the audio at the part of the video, and
wherein the controller generates the index of the type of the audio selected by a user from among the plurality of types of the audio.

2. The content playing apparatus according to claim 1, wherein the controller plays the part of the video corresponding to a type of the audio selected by a user from among the plurality of types of the audio.

3. The content playing apparatus according to claim 1, further comprising:
a receiver which receives the content; and
a storage unit which stores the content,
wherein the controller generates the index when content is received and stored in the storage unit.

4. The content playing apparatus according to claim 3, wherein the controller determines the type of the audio to be assigned to the index by matching properties of the audio and information about a plurality of detailed types of the audio that are provided in advance.

5. The content playing apparatus according to claim 4, wherein the controller designates at least one of the plurality of detailed types of the audio according to a user's input.

6. The content playing apparatus according to claim 1, wherein the controller plays the part of the video corresponding to properties of the audio at the part of the video at a speed designated by a user.

7. A control method of a content playing apparatus comprising:
generating an index of a video based on properties of the audio;
playing a part of the video corresponding to the properties of the audio at the part of the video by referring to the index,
wherein the generating the index comprises assigning at least one of a plurality of types of the audio to the index of the video based on the properties of the audio at corresponding parts of the video, and the playing the part of the video comprises playing the part of the video corresponding to a type of the audio at the part of the video, and
wherein the generating the index comprises generating the index for the type of the audio selected by a user from among the plurality of types of the audio.

8. The control method according to claim 7, wherein the playing the part of the video comprises playing the part of the video corresponding to a type of the audio selected by a user from among the plurality of types of the audio.

9. The control method according to claim 7, wherein the generating the index comprises generating the index when content comprising the video and the audio is received and stored in a storage unit.

10. The control method according to claim 9, wherein the generating the index comprises determining the type of the audio to be assigned to the index by matching properties of the audio and information about a plurality of detailed types of the audio that are provided in advance.

11. The control method according to claim 10, wherein the generating the index comprises designating at least one of the plurality of detailed types of the audio according to a user's input.

12. The control method according to claim 7, wherein the playing the part of the video comprises playing the part of the video corresponding to the properties of the audio at the part of the video at a speed designated by a user.

13. A control method of a content playing apparatus comprising:
obtaining content comprising audio and video;
generating and storing an index of the video based on properties of the audio at corresponding parts of the video: and
playing a part of the video corresponding to the properties of the audio by referring to the index, wherein the generating and storing of the index comprises:
- determining the properties of the audio at the corresponding part of the video; and
- assigning at least one of a plurality of audio types based on the properties of the audio at corresponding parts of the video.

14. The control method according to claim 13, wherein the assigning at least one of the plurality of audio types comprises designating at least one of a plurality of detailed audio types corresponding to the properties of the audio at corresponding parts of the video according to a user's input.

15. The control method according to claim 13, wherein the playing the part of the video comprises playing the part of the video corresponding to the properties of the audio selected by a user.

* * * * *